United States Patent
Weinberg et al.

(10) Patent No.: US 8,816,287 B2
(45) Date of Patent: Aug. 26, 2014

(54) STRUCTURES FOR RADIATION DETECTION AND ENERGY CONVERSION USING QUANTUM DOTS

(75) Inventors: Irving N. Weinberg, Bethesda, MD (US); Pavel Stepanov, North Potomac, MD (US); Mario G. Urdaneta, Berwyn Heights, MD (US)

(73) Assignee: Weinberg Medical Physics LLC, Bethesda, MD (US)

( * ) Notice: Subject to any disclaimer, the term of this patent is extended or adjusted under 35 U.S.C. 154(b) by 557 days.

(21) Appl. No.: 13/179,681

(22) Filed: Jul. 11, 2011

(65) Prior Publication Data

US 2012/0175584 A1    Jul. 12, 2012

Related U.S. Application Data

(63) Continuation-in-part of application No. 12/123,412, filed on May 19, 2008, now Pat. No. 7,977,643.

(60) Provisional application No. 61/010,929, filed on Jan. 14, 2008.

(51) Int. Cl.
| | |
|---|---|
| *G01T 1/16* | (2006.01) |
| *G01T 3/08* | (2006.01) |
| *G01T 1/24* | (2006.01) |
| *G21H 1/04* | (2006.01) |

(52) U.S. Cl.
CPC ... *G01T 1/16* (2013.01); *G01T 3/08* (2013.01); *G21H 1/04* (2013.01); *G01T 1/24* (2013.01); *G01T 1/242* (2013.01)
USPC ................................................. 250/370.01

(58) Field of Classification Search
CPC ................................. G01T 1/16; G21H 1/04
USPC ............ 250/370.01, 370.1, 370.12, 370.14; 257/E33.008; 310/300
See application file for complete search history.

(56) References Cited

U.S. PATENT DOCUMENTS

| | | | |
|---|---|---|---|
| 5,306,943 | A | 4/1994 | Ariyoshi et al. |
| 5,427,648 | A | 6/1995 | Pamulapati et al. |
| 6,169,287 | B1 | 1/2001 | Warburton |
| 6,259,099 | B1 | 7/2001 | Foulon et al. |
| 6,501,089 | B1 | 12/2002 | Kuwabara |
| 6,734,431 | B1 | 5/2004 | Glasser |
| 7,196,333 | B1 | 3/2007 | Gerstenmayer et al. |
| 7,203,279 | B2 | 4/2007 | Fujii et al. |

(Continued)

OTHER PUBLICATIONS

Benkstein et al; Influence of the Network Geometry on Electron Transport in Nanoparticle Networks; Proceedings of 2003 MRS Fall Meeting; Symposium N; vol. 789.

(Continued)

*Primary Examiner* — David Porta
*Assistant Examiner* — Faye Boosalis
(74) *Attorney, Agent, or Firm* — Barnes & Thornburg LLP

(57) ABSTRACT

Inorganic semiconducting materials such as silicon are used as a host matrix in which quantum dots reside to provide a radiation detector or energy converter. The quantum dot material may be disposed by incorporating materials sensitive to neutron detection such as boron-containing compounds, or the use of methods such as chemical vapor deposition or atomic layer deposition to insert the quantum dot material. Electrodes may be extended deep into the host matrix material to improve efficiency. Likewise, the host matrix may be machined to create pores in the matrix material. Further, amplification and signal-processing structures may be used in close proximity to the radiation-sensitive region of the device.

25 Claims, 3 Drawing Sheets

(56) References Cited

U.S. PATENT DOCUMENTS

| | | |
|---|---|---|
| 2004/0245497 A1 | 12/2004 | Hanna et al. |
| 2007/0100026 A1 | 5/2007 | Munro et al. |
| 2008/0122341 A1 | 5/2008 | Orita et al. |
| 2009/0217967 A1 | 9/2009 | Hovel et al. |

OTHER PUBLICATIONS

Campbell et al.; Quantum-Dot/Organic Semiconductor Composites for Radiation Detection; Adv. Mater.; vol. 1, No. 8; pp. 77-79; 2006.

Fano; Ionizaton yield of radiations. II. The fluctuations of the number of ions; Phys. Rev.; vol. 72; pp. 26-29; 1947.

Frank et al.; Does Network Geometry Influence the Electron Transport Dynamics in Mesoporous Nanoparticle Solar Cell?; Presented at Nat. Cent. for Photovolt. and Sol. Prog. Rev. Meeting; Denver, Colorado; Mar. 24-26, 2003.

Gerstenmayer; High DQE performance X- and gamma-ray fast imagers: Emergent concepts; Nucl. Instr. and Methods in Physics Research A; vol. 422; pp. 649-655; 1999.

Holke et al.; Ultra-deep anisotropic etching of (110) silicon; J. Micromech. Microeng.; vol. 9; pp. 51-57; 1999.

Huynh et al; CdSe Nanocrystal Rods/poly(3-hexylthiophene) Composite Photovoltaic Devices; Adv. Func. Mat.; vol. 11; p. 923; 1999.

Jeavons et al.; A 3D HIDAC-PET Camera with Sub-millimetre. Resolution for Imaging Small Animals; IEEE Trans on Nucl. Sci.; vol. 46; pp. 468-478; 1999.

Letant et al.; Study of porous glass doped with quantum dots or laser dyes under alpha irradiation; Applied Physics Letters; vol. 88; pp. 103110-103113; 2006.

Mohanan et al.; Porous Semiconductor Chalcogenide Aerogels; Science; vol. 307, No. 5708; pp. 397-400; 2005.

Owens; Semiconductor materials and radiation detectors; Journal of Synchrotron Radiation; vol. 13; pp. 143-150; 2006.

Talapin et al.; Highly Luminescent Monodisperse CdSe and CdSe/ZnS Nanocrystals Synthesized in a Hexadecylamine-Trioctylphosphine Oxide-Trioctylphosphine Mixture; Nano Lett. 1; pp. 207-211; 2001.

Wallace; Conjugated polymers: New materials for photovoltaics; Chemical Innovation; vol. 30, No. 1; pp. 14-22; 2000.

Watt et al.; A new approach to the synthesis of conjugated polymer-nanocrystal composites for heterojunction optoelectronics; Chem. Commun.; pp. 2334-2335; 2004.

Watt et al.; Carrier Transport in PbS Nanocrystal Conducting Polymer Composites; Appl. Phys. Lett. 87; p. 253109; 2005.

Search Report and Written Opinion for International Patent Application No. PCT/US2009/030309 filed Jan. 7, 2009.

(A) (B)

STRUCTURES FOR RADIATION DETECTION AND ENERGY CONVERSION USING QUANTUM DOTS

CROSS-REFERENCE TO RELATED APPLICATION(S)

This is a Continuation-In-Part application of U.S. patent application Ser. No. 12/123,412 under 35 U.S.C. 120, entitled RADIATION DETECTOR ASSEMBLY, RADIATION DETECTOR, AND METHOD FOR RADIATION DETECTION, filed on May 19, 2008, which in turn application relies for priority on U.S. Provisional Patent Application Ser. No. 61/010,929, filed on Jan. 14, 2008 the entirety of both of which being incorporated by reference herein.

BACKGROUND

This disclosure concerns an apparatus and a method for radiation detection and/or energy conversion. More specifically, this disclosure describes a semiconductor type composite material useable for radiation detection and/or energy conversion and methods of use of that material. For the purposes of this disclosure, the term device is used to mean an apparatus for radiation detection and/or energy conversion, as well as a combination of such devices.

SUMMARY

As indicated in U.S. patent application Ser. No. 12/123,412, inorganic semiconductors (for example, silicon) can be used as a host matrix in which quantum dots reside. The currently disclosed embodiments include additional detail with respect to the quantum dot material (for example incorporating materials sensitive to neutron detection such as boron-containing compounds, or the use of methods such as chemical vapor deposition or atomic layer deposition to insert the quantum dot material), the electrode structure (for example, extending electrodes deep into the host matrix material), the host matrix (for example, machining the matrix material, creating pores in the matrix material, or using various materials such as silicon, silicon carbide, germanium, or porous aluminum), or the use of amplification and signal-processing structures in close proximity to the radiation-sensitive region of the device.

BRIEF DESCRIPTION OF THE FIGURES

Aspects and features of the invention are described in connection with various figures, in which.

DETAILED DESCRIPTION

Figure 1:
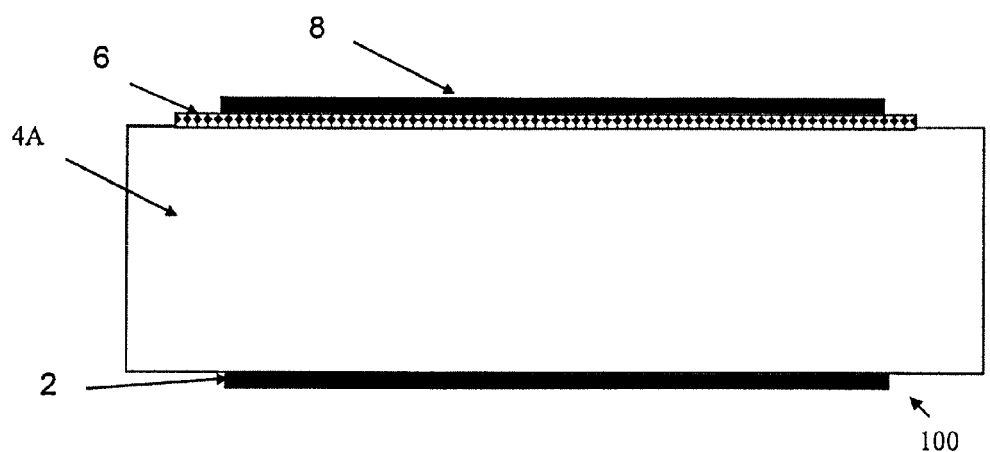
FIG. 1 is an example of a device constructed according to the disclosed embodiments using a host matrix material that does not contain pores.

As disclosed in U.S. patent application Ser. No. 12/123,412, silicon and other inorganic materials can be used as a host matrix to constitute a device for detecting radiation or for converting radiation into electricity. The quantum dots can be introduced into the host matrix through pores or machined or etched grooves or structures.

The electrodes of individual devices made using the previously disclosed methodologies and those of the presently disclosed embodiments can be connected together to create a radiation conversion and/or detection device that is thicker than a single individual device.

Neutrons are harder to detect than charged particles (e.g., electrons or protons) because neutrons are electrically neutral particles and don't ionize directly. To improve neutron detection efficiency, quantum dot can contain one or more materials that interact with neutrons by emitting other forms of ionizing radiation. Examples of materials that have high cross section for neutron absorption are include but not limited to Helium-3, Lithium-6 and Uranium-235. Upon interaction with neutron the absorber material would re-emit high energy ionized particles, the ionization track of which can be detected. Likewise, host matrix can contain materials with high cross section for neutron detection. Materials with high cross section for neutron detectors can be added during quantum dot synthesis or can be introduced after the synthesis using diffusion, implantation or any other suitable process. Similar methods can be used to add materials with high cross section for neutron detectors to the host matrix or the materials can be added in to porous portion of the host matrix during the porous loading stage.

Semiconductors other than silicon, for example, germanium, silicon carbide, gallium arsenide, may be used as a host matrix material instead of silicon or in combination with silicon. Conducting materials that form a suitable junction with the quantum dot material can also be used instead of silicon, or in combination with silicon. A suitable junction between the conductor and the quantum dot material is when the conductor makes a Schottky barrier with the quantum dot material. An example of a conductive material includes aluminum. Porous forms of aluminum or other metals (also known as metal foams) may be used as a suitable replacement for porous silicon.

The currently disclosed embodiments differ from conventional approaches (e.g., that disclosed in Hovel et al.(US 20090217967)) in that the presently disclosed embodiments do not require a PN layer to maintain junctional activity (e.g., to create depletion of carriers when appropriately biased). Rather, in accordance with the presently disclosed embodiments, the junctional activity may exist between the quantum dots themselves and neighboring material(s) (e.g., the semiconductor host matrix), or between the central component of the quantum dot and its coating material, between the coating of the quantum dots and neighboring material(s), etc. These neighboring materials may include silicon PN layers as disclosed in Hovel et al.

Deposition of the quantum dots within the host matrix material may be performed by adding the quantum dots to the host matrix material via deposition of the quantum dots in a liquid carrier; subsequently, that liquid carrier may be evaporated or otherwise removed. Alternatively, the quantum dot material may be deposited inside the host matrix material through chemical vapor deposition, atomic layer deposition, or other gas-phase deposition methods. Using any of these deposition modes, the quantum dot material coats the surface of the porous silicon with a degree of evenness which depends on the method and method parameters employed. The thickness of the layer being deposited increases as the deposition proceeds.

In order to provide increased surface area for the quantum dots to interact with the host matrix material, the host matrix material can be made porous or can be micro-machined to contain extended or long cavities. Creating long hollow structures or extensive pores in the host matrix can increase the amount of quantum dot material that incoming photons must pass through when traveling normal to the device; this type of structure, therefore, increases the likelihood of interaction between the photon and the quantum dot material.

The configuration of the device is particularly important when the incoming photons are of high energy, which need a greater material thickness in order to be absorbed and/or detected by the device. By creating long pores or structures in the host matrix, the effective volume of the quantum dot material is increased (thereby making the detector more sensitive to radiation) without increasing the distance that the charge carriers need to travel before they are collected (by the host matrix material or an electrode). Since the charge carriers may have a short lifetime outside of the silicon matrix, keeping the distance that the carriers travel until they arrive in the silicon matrix may be useful.

In at least one disclosed embodiment, an electrode may be deposited upon one side of a host matrix, the host matrix material may be made porous, quantum dots may be deposited in the pores, and an electrode material may be deposited upon the quantum dot layer.

The host matrix material can be made porous through a process known as anodic etching, in which an inorganic semiconductor (for example, silicon) is immersed in a solution containing hydrofluoric acid and connected in an electrolytic cell configuration. This process is similar to that described in Pamulapati, et al. (U.S. Pat. No. 5,427,648), the disclosure of which being incorporated herein by reference. Anodic etching produces pores of a diameter of 1 through 100 nm.

Pores can be created in the host matrix without a preferred direction (i.e., isotropic), or can be created in a preferred (i.e., anisotropic) direction. The preferred direction can be normal to the expected direction of incident radiation. Whether the pores are isotropic or anisotropic depends on the anodic etching conditions (i.e., temperature, composition of the solution, voltage, current, agitation, illumination, geometric configuration of the electrolytic cell, etc.). Porous silicon with isotropic pores is typically tens of micrometers in thickness. Porous silicon with anisotropic pores can be much thicker. Anisotropic porous silicon films of 1 mm in thickness have been reported, for example by A. Holke and H. T. Henderson, "Ultra-deep anisotropic etching of (110) silicon", J. Micromech. Microeng., 9, p 51-57, 1999, the disclosure of which being incorporated by reference.

Long hollow cavities other than pores can be created chemically or with non-chemical means that we denote as micro-machining, such as reactive ion etching, deep reactive ion etching, wet etching, laser ablation, diamond saw cutting, etc. For the purpose of this disclosure, the term "micromachining" refers to the creation of cavities larger than one micron in size.

In accordance with at least one disclosed embodiment, the long hollow cavities or pores may be coated and/or filled with quantum dots and/or electrode material.

FIG. 1 is an example of a device constructed with the methods of the invention, using a host matrix material that does not contain pores. FIG. 1 provides a cross-sectional view of a quantum dot implemented detector 100 without porous silicon. As shown in FIG. 1, a first electrode 2 is provided in proximity to silicon 4A and a second electrode 8. Within the silicon 4 is provided the quantum dots 6.

Figure 2:
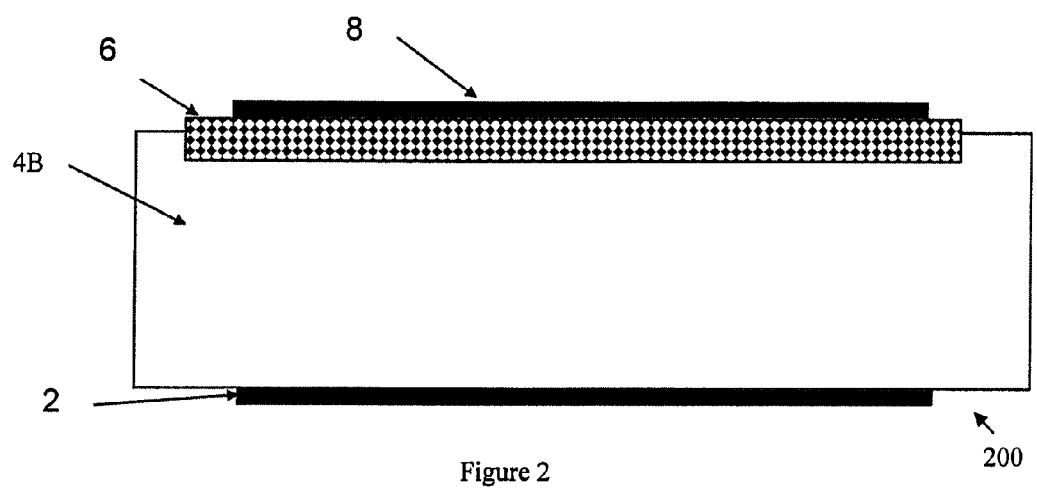
FIG. 2 is an example of a device constructed using a host matrix material, in which at least part of the host matrix material contains pores.

FIG. 2 is an example of a device constructed using a host matrix material, in which at least part of the host matrix material contains pores. FIG. 2 provides a cross-sectional view of a quantum dot implemented detector with porous silicon. As shown in FIG. 2, a first electrode 2 is provided in proximity to silicon 4B and a second electrode 8. The quantum dots 6 are provided within the porous silicon 4B.

Figure 3:
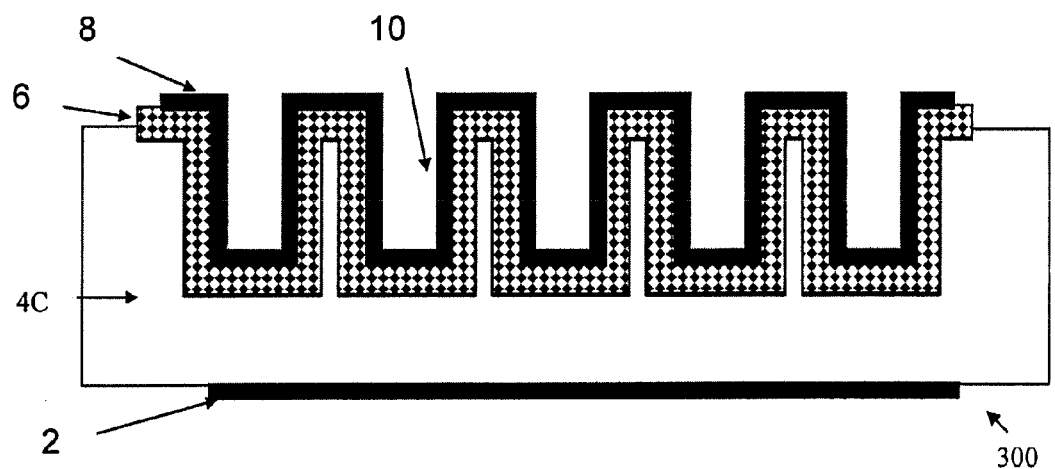
FIG. 3 is an example of a device constructed using a host matrix material in which at least one surface has been micro-machined, and in which valleys the quantum dots are located.

FIG. 3 is an example of a device constructed using a host matrix material in which at least one surface has been micro-machined to produce valleys or indentations, and in which valleys the quantum dots are formed. FIG. 3 illustrates a cross-sectional view of a quantum dot implemented detector with micromachining. As shown in FIG. 3, a first electrode 2 is provided in proximity to silicon 4C and a second electrode 8. The quantum dots 6 are provided within the porous silicon 4C. As can be seen in the figure, a portion 10 of the silicon has been removed through micromachining.

Figure 4:
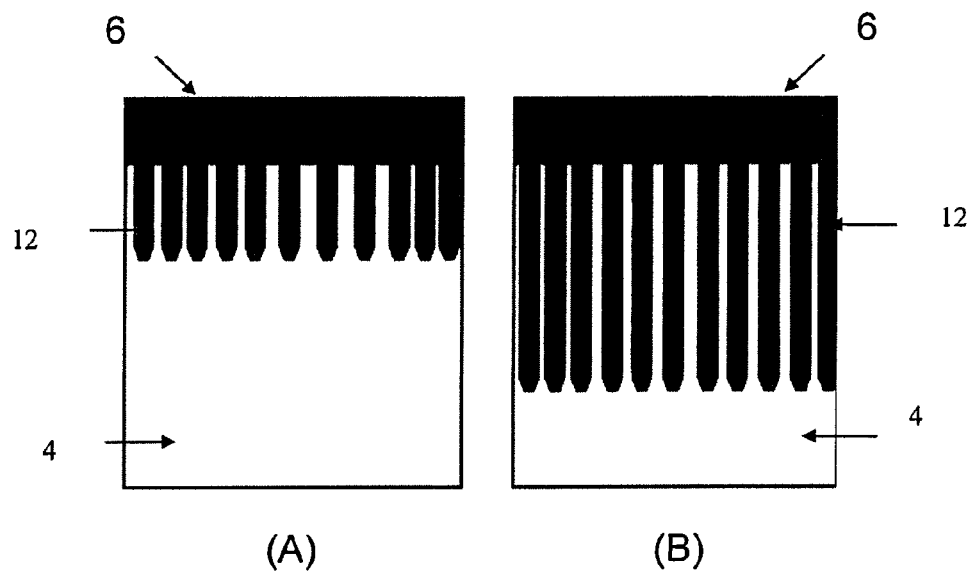
FIGS. 4A-4B demonstrate examples of a process in which varying the processing time can result in longer pores.

FIGS. 4A-4B demonstrate processes in which varying the processing time can result in longer pores. By filling pores that travel deeper into the substrate with quantum dots, the effective thickness of the active volume of the detector is increased in the device on the right. As shown in FIGS. 4A-4B, the silicon 4D includes pores 12 made in the silicon by anodic etching and is coupled to the first electrode 2 (the second electrode 8 not illustrated). The pores 12 made in the silicon may be enlarged by a longer anodic etching processing time as indicated in the difference between FIG. 4A and FIG. 4B.

Thus, the host matrix material may include electrode structures that extend deep into the host matrix material. One technical effect of these electrode structures may be to reduce the distance that carriers must travel before being collected. In addition, information about the energy of the incident radiation may be more accurately collected, e.g., when the structure is used as a radiation detector.

The electrode structures utilized in the disclosed embodiments may be made of conducting or semiconducting materials. The structure may utilize at least two electrodes. In accordance with at least one disclosed embodiment, the electrodes may be located on device surfaces opposite to each other, although they can also be located next to each other on the same surface. A plurality of electrodes (two or more than two) may be used on one or more surfaces of the device, in applications in which the device is to be used to image the source of incoming radiation. One technical effect of employing multiple electrodes is to enable the registration of the response of different electrodes separately, which then can be used to construct images of a source or sources of radiation. Additional utility may be derived from using a plurality of electrodes, for example, a lower electrode capacitance when compared to a single electrode that covers comparable area as the combined area of the plurality of electrodes.

It should be understood that the electrodes may be located on the quantum dot material or on the silicon.

Figure 5:
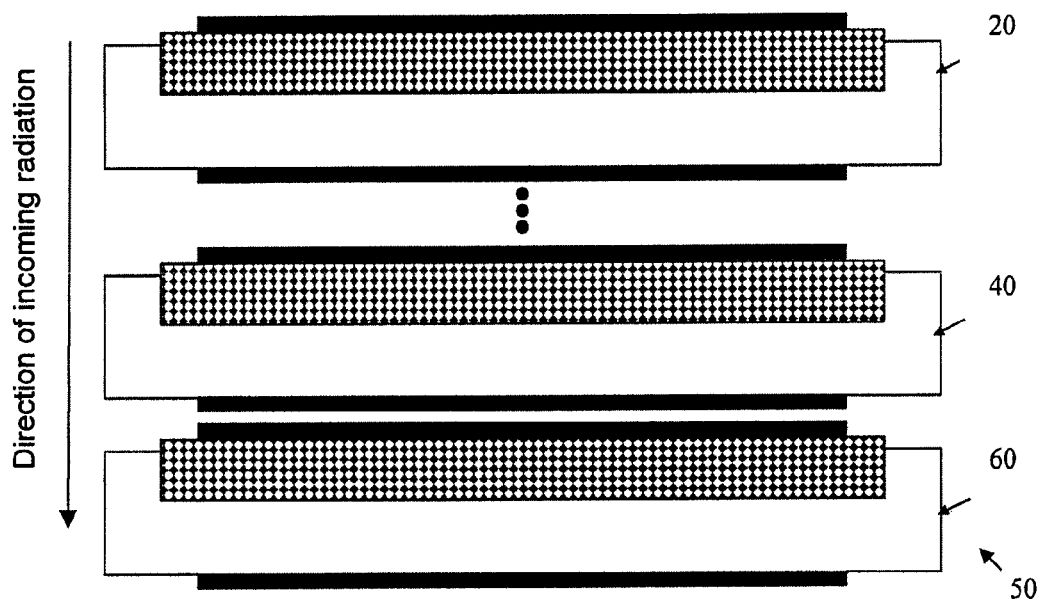
FIG. 5 illustrates a structure formed by stacking multiple devices in the direction parallel to the incoming radiation, which results in a greater device effective thickness.

As explained above with reference to FIGS. 4(A)-4(B) the ability to convert radiation into electricity may be increased by making the porous silicon layer thickness larger; this may be done by making the pores travel deeper into the silicon. Another approach is to increase the effective thickness of the active volume of the device by stacking several devices in a direction parallel to the incoming radiation. Such an implementation is illustrated in FIG. 5, wherein stacking multiple devices in the direction parallel to the incoming radiation results in a greater device effective thickness. As shown in FIG. 5, the device 20 is closest to the source of radiation 30, while the device 40 is the nth device in the stack of devices 50. Accordingly, there are n–2 devices between 20 and 40. Thus, the n+1th device 60, is furthest from the source of radiation.

Figure 6:
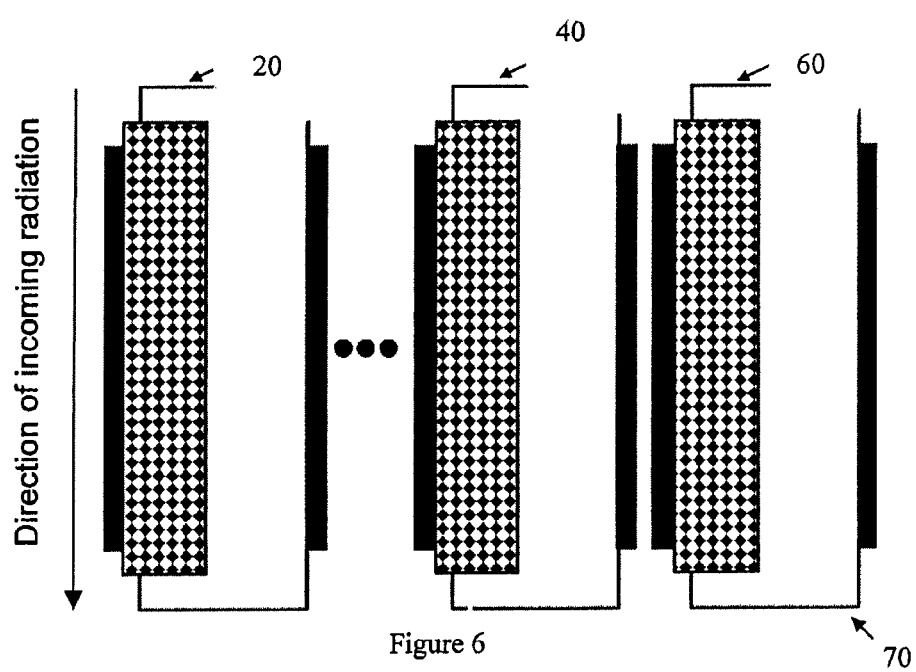
FIG. 6 illustrates a structure formed by stacking multiple devices in the direction perpendicular to the incoming radiation, which also results in a greater device effective thickness.

Likewise, another approach to increase the effective thickness of the active volume of the device is to place the surface of the device parallel to the direction of the incoming radiation, as illustrated in FIG. 6. Stacking multiple devices in the direction perpendicular to the incoming radiation to form a stack 70 can result in the coverage of an equivalent area of exposure as if the device surface was perpendicular to the direction of the incoming radiation. In this implementation, all constituent devices within the stack 70 are roughly the same distance from the radiation source.

Regardless of whether one or more than one device is used, the electrical signal created in the device (or device stack) as a result of radiation is generally processed in order to interface with a computer. Thus, it is within the level of skill in the art to recognize, that signal processing may include pre-amplification, amplification, shaping, filtering, analog-to-digital conversion, logic processing, and communication to outside components coupled to the computer(s).

Accordingly, it may be useful to physically place circuit elements (for example, transistors) configured to processing the generated signal in a location near where the generation of electric energy occurs so as to limit the degree of distortion or degradation of the signal. As a result, disclosed embodiments may include provision for some or all signal processing (e.g., for partial, preliminary or complete processing) to be performed on or adjacent to the same substrate that comprises the host matrix material. One potential configuration of the signal processing components is for one or more circuit elements to be fabricated directly on the host matrix material. The components for signal processing may also include discrete components attached to the device directly, or attached to appropriate interfaces that in turn attach directly to the device.

The portion of the silicon in which electrical components are fabricated must meet the requirements of the component to be fabricated (e.g., proper silicon doping level and type and no porous silicon prepared in that region). The silicon properties optimal for making the silicon porous and for making electrical components may be different. One way of addressing this difference in silicon properties is to deposit a layer of silicon that has optimal properties for making electrical components on top of the portion of the silicon substrate intended to be the active area for detecting radiation (e.g., in which said active area has properties optimal for making porous silicon). The silicon layer for electrical components may be epitaxial, polycrystalline, or amorphous. The layer of silicon deposited for signal processing may be removed in portions of the substrate where the porous silicon is to be formed. The layer of silicon responsible for signal processing may need to be protected during the fabrication of other device features, particularly during the formation of porous silicon. The portion of the silicon intended to be the active area may need to be protected from fabrication operations for formation of the electrical components. Moreover, it should be understood that a stack of individual devices as shown in FIG. 5 can include signal processing sections within individual devices in the stack or between individual devices in the stack.

We claim:

1. An assembly for converting radiation to electrical energy, comprising:
    a host matrix of inorganic semiconducting material defining a first surface and a second surface and a thickness disposed between the first and second surfaces;
    a plurality of nanoparticles interspersed within the thickness of the host matrix, the plurality of nanoparticles in combination with the host matrix generating at least one charge carrier upon interaction with the radiation;
    a first electrode disposed adjacent to the first surface of the host matrix; and
    a second electrode disposed adjacent to the second surface of the host matrix,
    wherein, the generated electrical energy is output from the pair of the first and second electrodes.

2. The assembly of claim 1, wherein the assembly is configured to convert at least one of the following types of radiation to electrical energy: infrared, visible, ultraviolet, x-ray, gamma, beta, cosmic rays, neutrons, and geothermal.

3. The assembly of claim 1, wherein the thickness between the first and second surfaces is in the range of 1 micrometer and 10 centimeters.

4. The assembly of claim 1, wherein at least a portion of host matrix is made of porous silicon.

5. The assembly of claim 4, wherein the thickness of porous silicon is in the range of 1 micrometer and 10 centimeters.

6. The assembly of claim 1 wherein at least one of a resistor, a capacitor, and a transistor is formed using the same substrate as was used to form the host matrix or a suitable material added to the same substrate as was used to form the host matrix.

7. The assembly as of claim 6, wherein thickness between first and second surface is in the range of 1 micrometer and 10 centimeters.

8. An assembly for converting radiation to electrical energy, comprising:
    a host matrix defining a first surface and a second surface and a thickness disposed between the first and second surfaces;
    a plurality of nanoparticles interspersed within the thickness of the host matrix, the plurality of nanoparticles in combination with the host matrix generating at least one charge carrier upon interaction with the radiation;
    a first electrode disposed adjacent to the first surface of the host matrix; and
    a second electrode disposed adjacent to the second surface of the host matrix,
    wherein, the generated electrical energy is output from the pair of the first and second electrodes, and
    wherein the plurality of nanoparticles enables charge transport from particle to particle in at least one particle network within the host matrix.

9. The assembly of claim 8, wherein the assembly is configured to convert at least one of the following types of radiation to electrical energy: infrared, visible, ultraviolet, x-ray, gamma, beta, cosmic rays, neutrons, and geothermal.

10. The assembly of claim 8, wherein the thickness between first and second surface is in the range of 1 micrometer and 10 centimeters.

11. The assembly of claim 8, wherein at least a portion of host matrix is of porous silicon.

12. The assembly of claim 11, wherein the thickness of porous silicon is in the range of 1 micrometer and 10 centimeters.

13. The assembly of claim 8, wherein at least one of a resistor, a capacitor, and a transistor is formed using the same substrate as was used to form the in the host matrix or a suitable material added to the same substrate as was used to form the host matrix.

14. A radiation detector, comprising:
    a plurality of assemblies for converting radiation to electrical energy, disposed adjacent to one another in a stacked fashion, each of the assemblies comprising:

a host matrix of inorganic semiconducting material defining a first surface and a second surface and a thickness disposed between the first and second surfaces, a plurality of nanoparticles interspersed within the thickness of the host matrix, the plurality of nanoparticles in combination with the host matrix generating at least one charge carrier upon interaction with the radiation, a first electrode disposed adjacent to the first surface of the host matrix, and a second electrode disposed adjacent to the second surface of the host matrix, wherein, the generated electrical energy is output from the pair of the first and second electrodes.

15. The radiation detector of claim 14, wherein the detector is configured to detect at least one of the following types of radiation: infrared, visible, ultraviolet, x-ray, gamma, beta, cosmic rays, neutrons, and geothermal.

16. The detector of claim 14, wherein at least a portion of host matrix is made of porous silicon.

17. The detector of claim 16, wherein the thickness of porous silicon is in the range of 1 micrometer and 10 centimeters.

18. The detector of claim 14, wherein at least one of a resistor, a capacitor, and a transistor is formed using the same substrate as was used to form the host matrix or a suitable material added to the same substrate as was used to form the host matrix.

19. A radiation detector; comprising:
a plurality of assemblies for converting radiation to electrical energy, disposed adjacent to one another in a stacked fashion, each of the assemblies comprising:
a host matrix defining a first surface and a second surface and a thickness disposed between the first and second surfaces, a plurality of nanoparticles interspersed within the thickness of the host matrix, the plurality of nanoparticles in combination with the host matrix generating at least one charge carrier upon interaction with the radiation, a first electrode disposed adjacent to the first surface of the host matrix, and a second electrode disposed adjacent to the second surface of the host matrix, wherein, the generated electrical energy is output from the pair of the first and second electrodes, and wherein at least one outer coating encapsulating at least one of the plurality of nanoparticles, the coating changing the electrical behavior of the at least one nanoparticle.

20. The detector of claim 19 wherein, the detector is configured to detect at least one of the following types of radiation: infrared, visible, ultraviolet, x-ray, gamma, beta, cosmic rays, and neutrons, geothermal.

21. The detector of claim 19, wherein the detector is configured to detect neutrons, wherein at least one of the host matrix and the nanoparticles contained therein contain at least one atom of Hydrogen, Helium, Lithium, and/or Boron.

22. The detector of claim 19, wherein the detector is configured to detect neutrons, wherein at least one of the host matrix, the nanoparticles and the at least one outer coating contain at least one atom of Hydrogen, Helium, Lithium, and/or Boron.

23. The detector of claim 19, wherein at least a portion of host matrix is made of porous silicon.

24. The detector of claim 23, wherein at least one of a resistor, a capacitor, and a transistor is formed using the same substrate as was used to form the host matrix.

25. The detector of claim 24, wherein the thickness of porous silicon is in the range of 1 micrometer and 10 centimeters.

* * * * *

UNITED STATES PATENT AND TRADEMARK OFFICE
CERTIFICATE OF CORRECTION

PATENT NO. : 8,816,287 B2  
APPLICATION NO. : 13/179681  
DATED : August 26, 2014  
INVENTOR(S) : Irving Weinberg, Pavel Stepanov and Mario Urdaneta Page 1 of 1

It is certified that error appears in the above-identified patent and that said Letters Patent is hereby corrected as shown below:

In the specification

In column 1, at line 17 insert:

--GOVERNMENT LICENSE RIGHTS

This invention was made with government support under grant number 5R44CA138013 awarded by National Institutes of Health. The U.S. Government has certain rights in the invention.--

Signed and Sealed this  
Twenty-fourth Day of May, 2016

Michelle K. Lee  
*Director of the United States Patent and Trademark Office*